United States Patent
Sekine et al.

(10) Patent No.: US 7,023,654 B2
(45) Date of Patent: Apr. 4, 2006

(54) DISK CARTRIDGE EJECTION MECHANISM AND METHOD

(75) Inventors: Takehiko Sekine, Hachioji (JP); Kouichi Eguro, Hachioji (JP); Katsumi Fujiwara, Hachioji (JP)

(73) Assignee: Konica Corporation, Tokyo (JP)

( * ) Notice: Subject to any disclaimer, the term of this patent is extended or adjusted under 35 U.S.C. 154(b) by 183 days.

(21) Appl. No.: 10/633,558

(22) Filed: Aug. 5, 2003

(65) Prior Publication Data

US 2004/0027714 A1   Feb. 12, 2004

(30) Foreign Application Priority Data

Aug. 9, 2002   (JP) .............................. 2002-233352

(51) Int. Cl.
*G11B 5/00*   (2006.01)

(52) U.S. Cl. .................. 360/96.5; 720/637; 720/638

(58) Field of Classification Search ................ 720/636, 720/637, 638; 360/99.06, 245.1
See application file for complete search history.

(56) References Cited

U.S. PATENT DOCUMENTS

| | | | | |
|---|---|---|---|---|
| 5,291,356 A | * | 3/1994 | Matsumoto et al. | 360/99.06 |
| 5,490,023 A | * | 2/1996 | Watanabe | 360/99.06 |
| 5,646,926 A | * | 7/1997 | Handa et al. | 720/636 |
| 5,724,331 A | * | 3/1998 | Davis et al. | 720/633 |
| 5,831,958 A | * | 11/1998 | Kurita | 720/637 |
| 6,081,494 A | * | 6/2000 | Morimoto et al. | 720/632 |
| 6,275,459 B1 | * | 8/2001 | Obata et al. | 720/636 |
| 2002/0131201 A1 | * | 9/2002 | Bagnell et al. | 360/99.06 |

* cited by examiner

*Primary Examiner*—William Korzuch
*Assistant Examiner*—Mark Blouin
(74) *Attorney, Agent, or Firm*—Finnegan, Henderson, Farabow, Garrett & Dunner, L.L.P.

(57) ABSTRACT

A disk cartridge ejection mechanism in which a disk cartridge is moved from a loading position where recording and reproducing of information are possible for a medium in the cartridge to a cartridge-removable position where the cartridge can be taken out of an information recording and reproducing apparatus, wherein there are provided a cartridge engagement device that engages with the cartridge when the cartridge moves from the loading position to the cartridge-removable position to prohibit the cartridge to move beyond the cartridge-removable position, a cartridge engagement assistance device that prevents releasing of engagement of the cartridge engagement device for the cartridge, when the cartridge moves to the cartridge-removable position and an assistance releasing device that releases the state wherein a cartridge engagement assistance device that prevents releasing of engagement of the cartridge engagement device, after the cartridge moves from the loading position to the cartridge-removable position.

10 Claims, 12 Drawing Sheets

DISK CARTRIDGE EJECTION MECHANISM AND METHOD

BACKGROUND OF THE INVENTION

The present invention relates to a disk cartridge ejection mechanism for moving a disk cartridge from a loading position where reading and reproducing of information are possible for a medium in the disk cartridge to a disk-cartridge-removable position where the disk cartridge can be taken out of an information recording and reproducing apparatus, after setting the disk cartridge on the apparatus, and to a disk cartridge ejection method.

A recording medium such as MO, PD, MD, DVD, a flexible disk or a super flexible disk is usually housed in a disk cartridge. When inserting an uncovered disk in a driving apparatus, the uncovered disk is first housed in a prescribed cartridge which is then inserted in the driving apparatus. When moving a disk cartridge from a loading position where reading and reproducing of information are possible for a medium in the disk cartridge to a disk-cartridge-removable position where the disk cartridge can be taken out of an information recording and reproducing apparatus, after setting the disk cartridge on the apparatus, there is available a disk cartridge ejection mechanism employing the urging force of an urging means such as a spring.

On the disk cartridge ejection mechanism of this kind, there is provided a cartridge engagement means that prevents a disk cartridge that is urged by urging force in the ejecting direction from moving in the ejecting direction beyond the position where the disk cartridge can be taken out.

In the disk cartridge ejection mechanism having the aforesaid structure, however, the ejecting speed of the disk cartridge is increased depending on a thickness of the disk cartridge and on the state of surface of the disk cartridge, and sometimes, the disk cartridge cannot be stopped by the cartridge engagement means to jump out of the apparatus.

Though it is possible to prevent the disk cartridge from jumping out of the apparatus, by increasing the engagement force of the cartridge engagement means, there still remains a problem that the disk cartridge cannot be taken out easily, because greater force is needed to take out the disk cartridge from the position for taking out a disk cartridge.

Further, if the urging force of an urging means for urging the disk cartridge is made to be smaller, when a disk cartridge is thick or when the surface of the disk cartridge immediately after being unpacked is completely free from oil or others, there is a problem that the disk cartridge does not move to the position where a cartridge can be taken out.

SUMMARY OF THE INVENTION

The invention has been achieved in view of the problems mentioned above, and its object is to provide a disk cartridge ejection mechanism and mechanism wherein a disk cartridge surely stops at the position where the disk cartridge can be taken out and it is easy to take out a disk cartridge from the position where the disk cartridge can be taken out.

The aforementioned object can be achieved by either one of the following Structures (1)–(6).

Structure (1): A disk cartridge ejection mechanism in which a disk cartridge is moved from a loading position where recording and reproducing of information are possible for a medium in the disk cartridge to a disk-cartridge-removable position where the disk cartridge can be taken out of an information recording and reproducing apparatus, wherein there are provided a cartridge engagement means that engages with the disk cartridge at a point in time when at least the disk cartridge moves from the loading position to the position where the disk cartridge can be taken out to prohibit the disk cartridge to move further in the taking out direction beyond the position where the disk cartridge can be taken out, a cartridge engagement assistance means that prevents releasing of engagement of the cartridge engagement means for the disk cartridge, at a point in time when the disk cartridge moves from the loading position to the position where the disk cartridge can be taken out and an assistance releasing means that releases the state wherein a cartridge engagement assistance means that prevents releasing of engagement of the cartridge engagement means for the disk cartridge, after the disk cartridge moves from the loading position to the position where the disk cartridge can be taken out.

Structure (2): A disk cartridge ejection mechanism in which a disk cartridge is moved from a loading position where recording and reproducing of information are possible for a medium in the disk cartridge to a disk-cartridge-removable position where the disk cartridge can be taken out of an information recording and reproducing apparatus wherein there are provided an urging means that urges the disk cartridge in the ejecting direction, a locking means that prohibits a movement of the disk cartridge at a loading position, a locking releasing means that releases the locking means, a cartridge engagement means that engages with the disk cartridge at a point in time when at least the disk cartridge moves from the loading position to the position where the disk cartridge can be taken out to prohibit the disk cartridge to move further in the taking out direction beyond the position where the disk cartridge can be taken out, a cartridge stopper assistance means that prevents releasing of engagement of the cartridge engagement means for the disk cartridge, at a point in time when the disk cartridge moves from the loading position to the position where the disk cartridge can be taken out and an assistance releasing means that releases the state wherein a cartridge engagement assistance means prevents releasing of engagement of the cartridge engagement means for the disk cartridge, after the disk cartridge moves from the loading position to the position where the disk cartridge can be taken out.

In Structures (1) and (2) above, there are provided a cartridge engagement means that engages with the disk cartridge at a point in time when at least the disk cartridge moves from the loading position to the position where the disk cartridge can be taken out to prohibit the disk cartridge to move further in the taking out direction beyond the position where the disk cartridge can be taken out, a cartridge engagement assistance means that prevents releasing of engagement of the cartridge engagement means for the disk cartridge, at a point in time when the disk cartridge moves from the loading position to the position where the disk cartridge can be taken out and an assistance releasing means that releases the state wherein a cartridge stopper assistance means prevents releasing of engagement of the cartridge engagement means for the disk cartridge, after the disk cartridge moves from the loading position to the position where the disk cartridge can be taken out, and thereby, the cartridge engagement means engages with the disk cartridge at a point in time when the disk cartridge moves from the loading position to the position where the disk cartridge can be taken out to prohibit that the disk cartridge moves further in the taking out direction beyond the position where the disk cartridge can be taken out.

Therefore, the disk cartridge stops surely at the position where the disk cartridge can be taken out.

Further, after the disk cartridge moves from the loading position to the position where the disk cartridge can be taken out, the assistance releasing means releases the state wherein the cartridge engagement assistance means prevents releasing of engagement of the cartridge engagement means for the disk cartridge, and thereby, the disk cartridge is engaged with only the disk cartridge stopper at the position where the cartridge can be taken out, which makes it easy to take the disk cartridge out.

Structure (3): The disk cartridge ejection mechanism according to Structure (1) or Structure (2), wherein the cartridge engagement means is provided with an elastic arm having a convex portion that can be engaged with a concave portion of the disk cartridge, and the cartridge engagement assistance means has a lock arm with which the surface of the elastic arm of the cartridge engagement means that is opposite to the surface on which the convex portion is provided can come in contact.

When an ejecting speed of the disk cartridge is increased and the elastic arm of the cartridge engagement means having the convex portion engaging with the concave portion of the disk cartridge tries to part from the concave portion of the disk cartridge accordingly, the surface on the opposite side of the face on which the convex portion of the elastic arm of the cartridge engagement means of the cartridge engagement assistance means comes in contact with the lock arm capable of being touched, and the convex portion of the elastic arm of the cartridge engagement means is prohibited to part from the concave portion of the disk cartridge. Therefore, the disk cartridge stops surely at the position where the disk cartridge can be taken out.

Structure (4): The disk cartridge ejection mechanism according to Structure (3), wherein the cartridge engagement assistance means has a plate on which the lock arm is provided rotatbly and a lock arm urging means that urges the lock arm towards the elastic arm.

When a large force is applied on the elastic arm of the cartridge engagement means for some reasons to make the elastic arm to part from the concave portion of the disk cartridge, the cartridge engagement assistance means having the plate on which the lock arm is provided rotatbly and the lock arm urging means that urges the lock arm toward the elastic arm prevents damage of the elastic arm and the lock arm with the lock arm being pushed by the elastic arm to rotate, when the elastic arm tries to part with force greater than the urging force of the urging means.

Structure (5): The disk cartridge ejection mechanism according to Structure (4), wherein the plate of the cartridge engagement assistance means is provided to be movable in the cartridge ejecting direction, and has a plate guiding means that guides the plate between the position where the elastic arm can touch the lock arm and the position where the elastic arm does not touch the lock arm, and the locking releasing means has an ejection motor and an eccentric pin which is driven by the ejection motor to rotate and releases the locking means and the cartridge stopper assistance means, and when the ejection motor is driven, the eccentric pin releases the locking means first, and thereby, urging force of the urging means moves the disk cartridge from the position of loading to the position where the disk cartridge can be taken out, and it moves the plate of the cartridge stopper assistance means to the position where the elastic arm does not touch the lock arm after the disk cartridge arrives at the position where the disk cartridge can be taken out.

In the disk cartridge ejection mechanism mentioned above, the plate of the cartridge engagement assistance means is provided to be movable in the cartridge ejecting direction, and has a plate guiding means that guides the plate between the position where the elastic arm can touch the lock arm and the position where the elastic arm does not touch the lock arm, and the locking releasing means has an ejection motor and an eccentric pin which is driven by the ejection motor to rotate and releases the locking means and the cartridge engagement assistance means, and when the ejection motor is driven, the eccentric pin releases the locking means first, and thereby, urging force of the urging means moves the disk cartridge from the position of loading to the position where the disk cartridge can be taken out, and it moves the plate of the cartridge stopper assistance means to the position where the elastic arm does not touch the lock arm after the disk cartridge arrives at the position where the disk cartridge can be taken out. Therefore, the disk cartridge stops surely at the position where the disk cartridge can be taken out.

Structure (6): A disk cartridge ejection method for moving a disk cartridge from a loading position where reading and reproducing of information are possible for a medium in the disk cartridge to a disk-cartridge-removable position where the disk cartridge can be taken out of an information recording and reproducing apparatus, wherein the disk cartridge is held by the first holding force which does not allow the disk cartridge to move further, at least at a point in time when the disk cartridge has moved to a position where the disk cartridge can be taken out from the loading position, and afterwards, the disk cartridge is held by the second holding force that is smaller than the first holding force.

In the disk cartridge ejection method for moving a disk cartridge from a loading position where reading and reproducing of information are possible for a medium in the disk cartridge to a disk-cartridge-removable position where the disk cartridge can be taken out of an information recording and reproducing apparatus, the disk cartridge is held by the first holding force which does not allow the disk cartridge to move further, at least at a point in time when the disk cartridge has moved to a position where the disk cartridge can be taken out from the loading position, and afterwards, the disk cartridge is held by the second holding force that is smaller than the first holding force, and thereby, the cartridge engagement means engages with a disk cartridge and the cartridge engagement assistance means prevents releasing of engagement of the cartridge engagement means for the disk cartridge, at a point in time when the disk cartridge moves from the loading position to the position where the disk cartridge can be taken out. Therefore, the disk cartridge stops surely at the position where the disk cartridge can be taken out.

Further, after the disk cartridge moves from the loading position to the position where the disk cartridge can be taken out, the releasing means releases engagement of the cartridge engagement assistance means for the disk cartridge engagement means, and thereby, the disk cartridge is engaged with only the disk cartridge stopper at the position where the cartridge can be taken out, which makes it easy to take the disk cartridge out.

BRIEF DESCRIPTION OF THE DRAWINGS

Each of FIGS. 3(a) and 3(b) is a diagram illustrating a disk cartridge used for an optical disk driving apparatus of the present embodiment.

DETAILED DESCRIPTION OF THE PREFERRED EMBODIMENT

Figure 1:
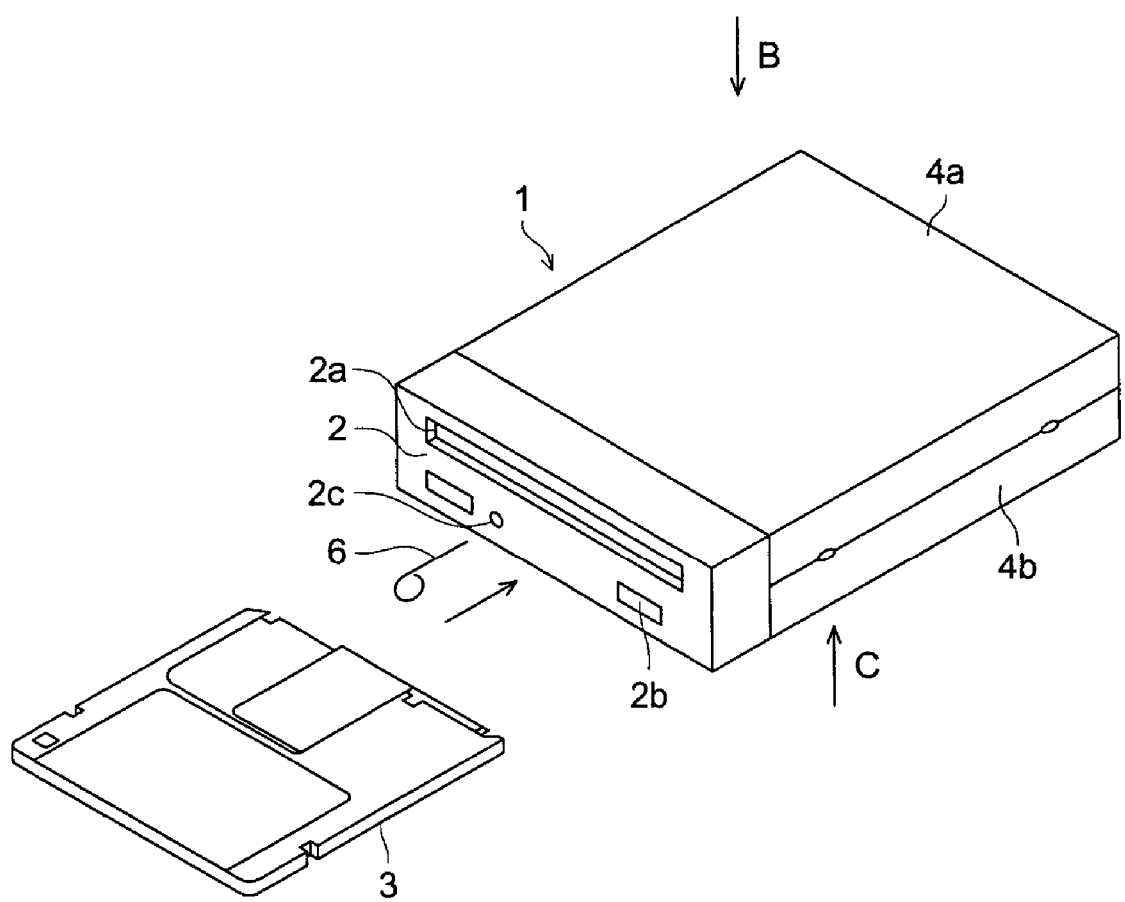
FIG. 1 is a diagram illustrating an external structure of a magneto-optical disk driving apparatus on which a disk cartridge ejection mechanism of the present embodiment is provided.

The disk cartridge ejection mechanism representing an embodiment of the invention will be explained as follows with an example of a magneto-optical disk driving apparatus, referring to drawings.

(1) External Structure

There will be explained, by using FIG. 1, the external structure of the magneto-optical disk driving apparatus on which the disk cartridge ejection mechanism of the present embodiment is provided.

In the drawing, insertion opening 2a through which a disk cartridge is inserted is formed on front bezel (front panel) 2 of the magneto-optical disk driving apparatus 1.

Further, on the front bezel 2, there are formed ejection switch 2b and hole 2c through which taking-out metallic pin 6 is inserted.

Figure 2:
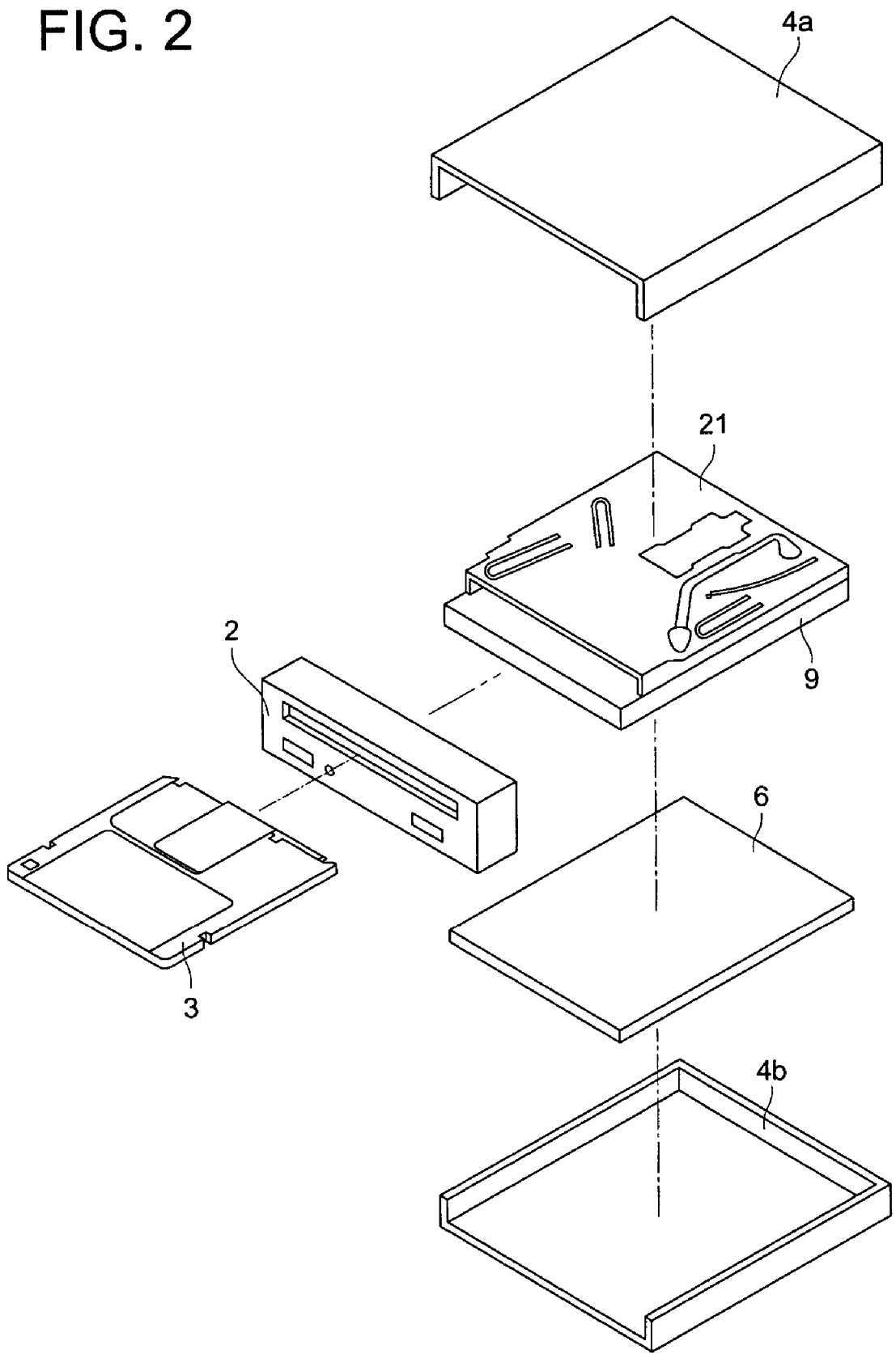
FIG. 2 is an exploded perspective view of FIG. 1.

Further, as shown in FIG. 2 representing an exploded perspective view of FIG. 1, a casing of the apparatus is composed of front bezel 2, upper case 4a and lower case 4b, and in the inside of the casing, there are provided base 9 and circuit base board 6. On the base 9, there is provided cartridge box 21.

(2) Disk Cartridge

Figure 3A:
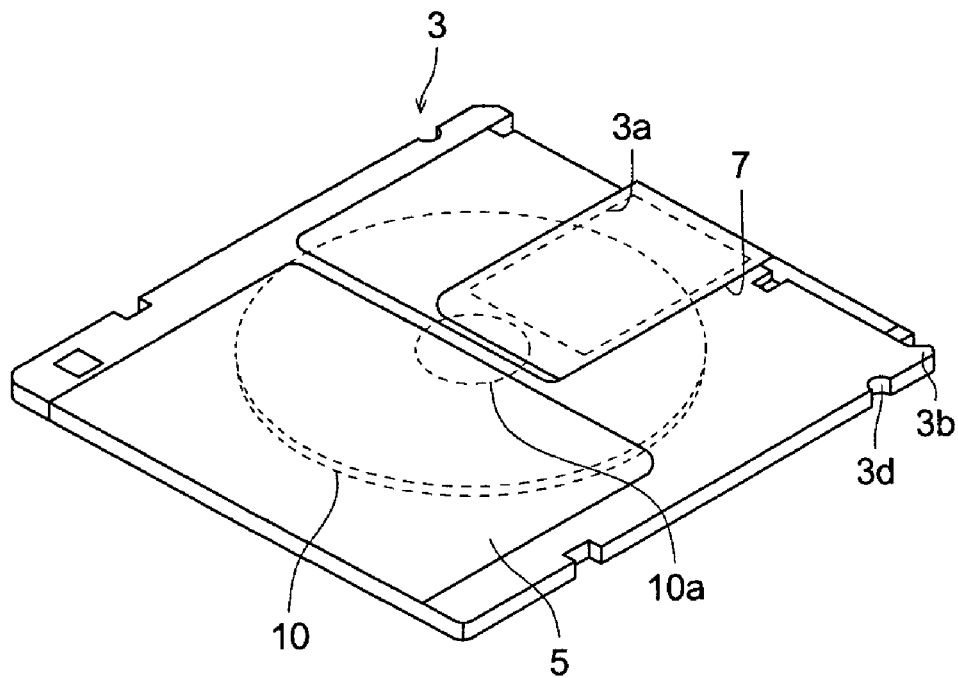
FIG. 3(a) shows a diagram of the surface of a cartridge and FIG. 3(b) shows a diagram of its reverse side.
Figure 3B:
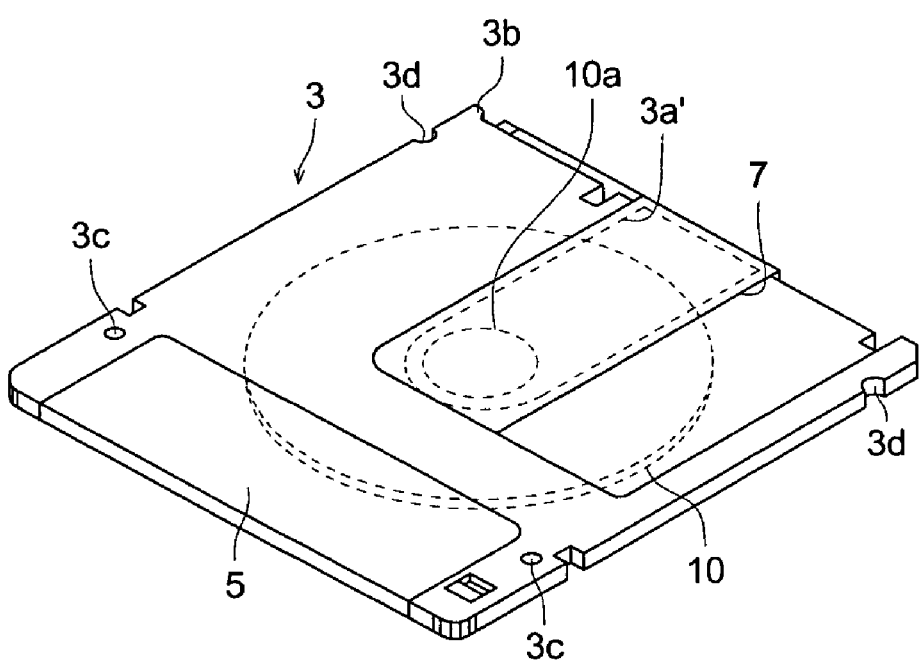

Disk cartridge 3 used for the present embodiment will be explained, referring to FIG. 3.

As shown in the drawing, magneto-optical disk (MO) 10 is housed in disk cartridge 3 rotatably.

On the surface on one side of the disk cartridge 3, there is formed hole 3a through which a recording surface of the magneto-optical disk 10 is exposed to the outside, and on the surface on the other side of the disk cartridge 3, there is formed hole 3a' through which a portion up to hub 10a of the magneto-optical disk 10 is exposed to the outside.

Shutter 7 that closes and opens hole 3a on the surface on one side of disk cartridge 3 and hole 3a' on the surface on the other side is provided to be capable of moving for disk cartridge 3, and this shutter 7 is urged in the direction to close hole 3a and hole 3a' by a spring (not shown) whose one end portion is engaged with disk cartridge 3 and the other end portion is engaged with the shutter 7.

(3) Inner Structure

Figure 4:
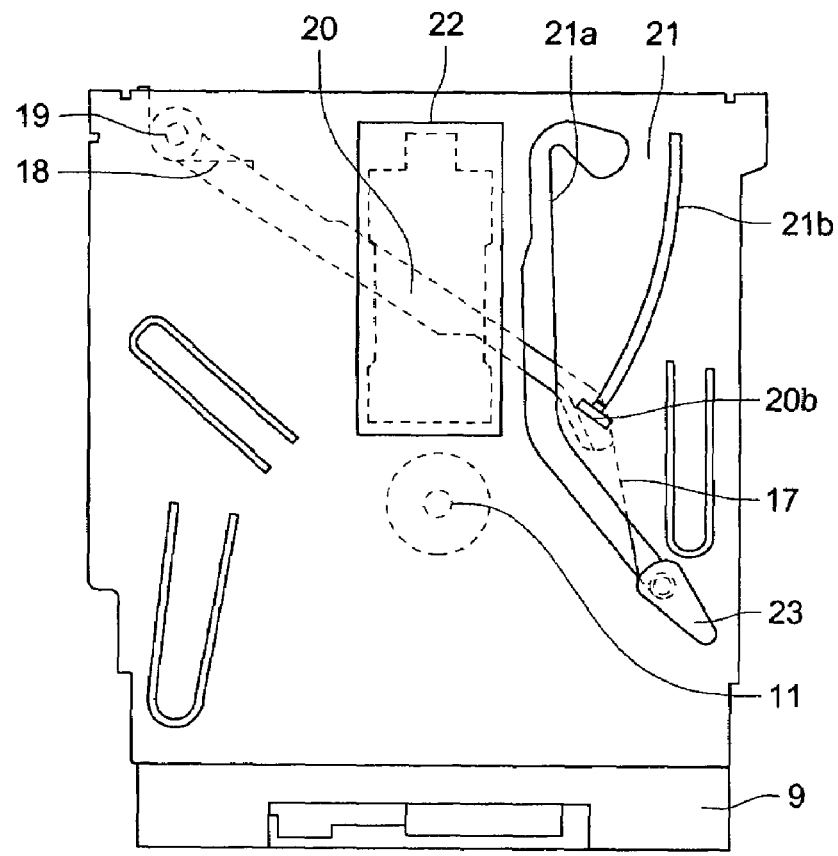
FIG. 4 is a diagram viewed in the direction of an arrow mark B in FIG. 1 after an upper case, a lower case, a front bezel, a circuit base board and a flexible print circuit are removed from a magneto-optical disk driving apparatus in which a disk cartridge is not inserted.
Figure 4:
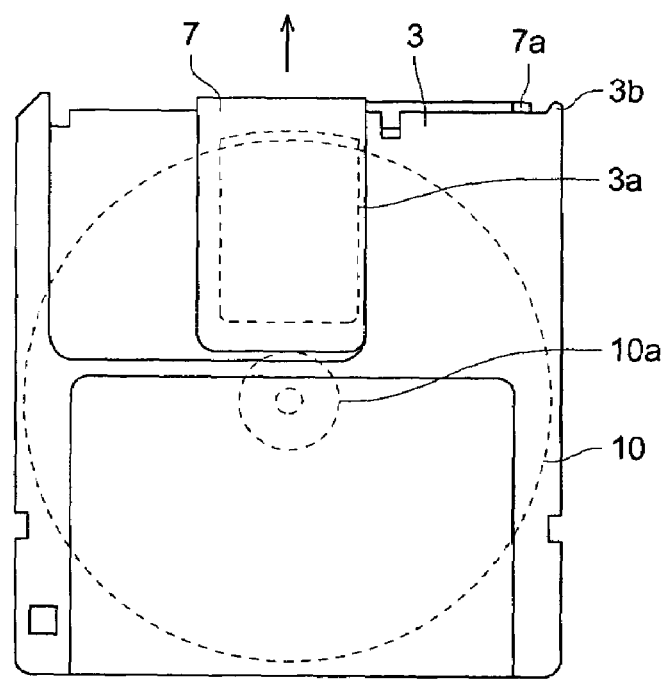
Figure 5:
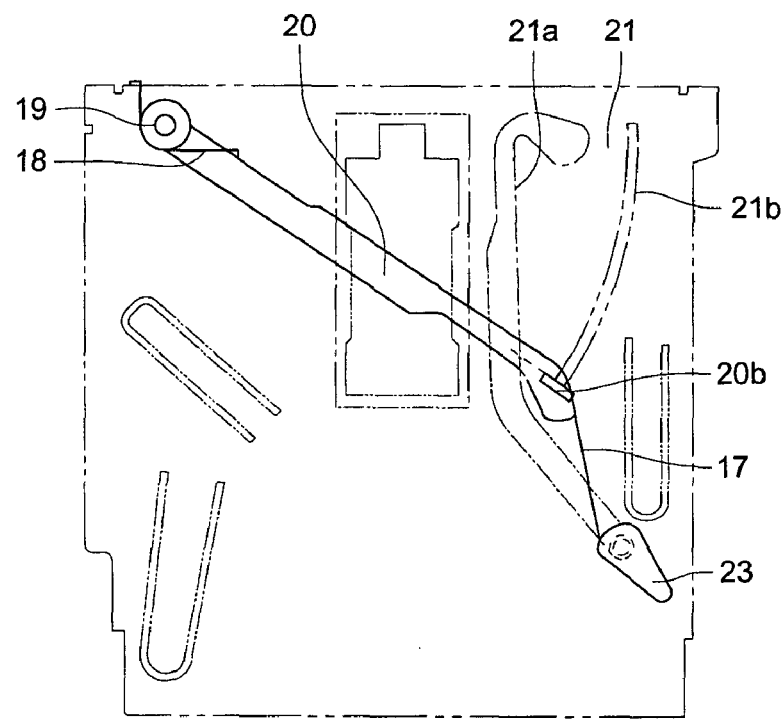
FIG. 5 is a diagram showing only an arm and a shutter opener in FIG. 4.

FIG. 4 is a diagram viewed in the direction of an arrow mark B in FIG. 1 after removing upper case 4a, lower case 4b, front bezel 2, circuit base board 6 and a flexible print circuit from magneto-optical disk driving apparatus 1 in which disk cartridge 3 is not inserted. FIG. 5 is a diagram showing only arm 20 and shutter opener 23 in FIG. 4, and FIG. 6 is a diagram showing the inside of a cartridge box that is viewed from the base 9 side in FIG. 4.

As shown in FIG. 4, cartridge box 21 is provided on the upper face of the base 9 so that the disk cartridge 3 may be inserted in a space between the upper face of the base 9 and the cartridge box 21. Further, on the cartridge box 21, there is provided bias magnet 22 for impressing an outer magnetic field for the magneto-optical disk when recording information on or erasing information from the magneto-optical disk.

On the upper face of the cartridge box 21, there is formed first guide groove 21a which movably engages with shutter opener 23 with which an end face of the disk cartridge 3 on the insertion side comes in contact.

Figure 6:
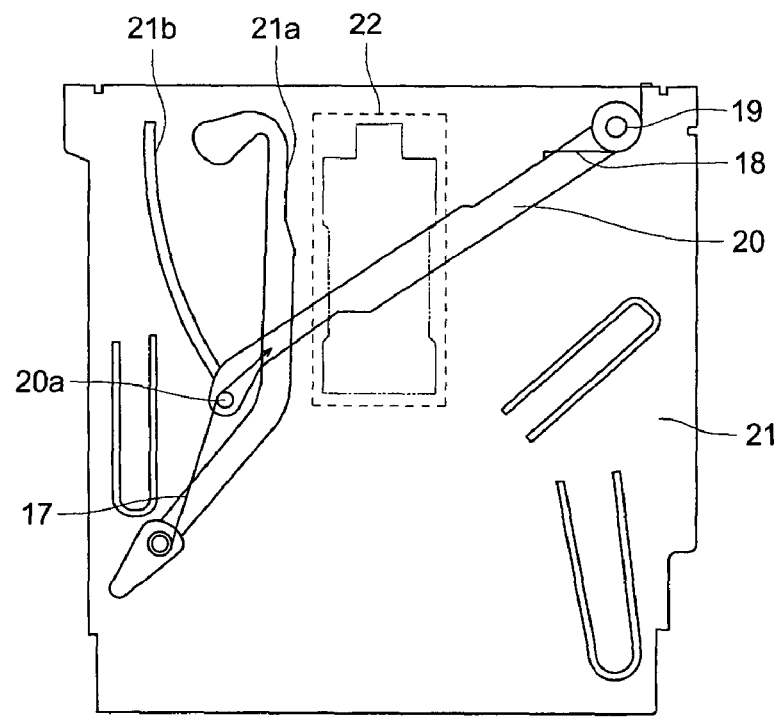
FIG. 6 is a diagram showing the inside of a cartridge box that is viewed from the base side in FIG. 4.

Further, as shown in FIGS. 5 and 6, arm 20 is arranged between the base 9 and the cartridge box 21, and a base end portion side of the arm 20 is mounted rotatably on an inner side of the cartridge box 21 by the use of pin 19. The arm 20 is urged toward cartridge insertion opening 2a by urging force of spring 18 whose middle portion is wound around the pin 19 and an end portion on one side of the spring is engaged with the cartridge box 21 while an end portion on the other side is rested on the arm 20. On the tip portion side of the arm 20, there is formed first projection 20a. Shutter opener 23 is urged toward cartridge insertion opening 2a by spring 17 whose middle portion is wound around the first projection 20a, an end portion on one side is rested on shutter opener 23 and an end portion on the other side is engaged with arm 20. Therefore, the spring 17 and spring 18 function as an urging means that urges disk cartridge 3 in the direction of ejection.

Further, on the cartridge box 21, there is formed second guide groove 21b that engages with second projection 20b that is formed on the tip portion of the arm 20.

Figure 7:
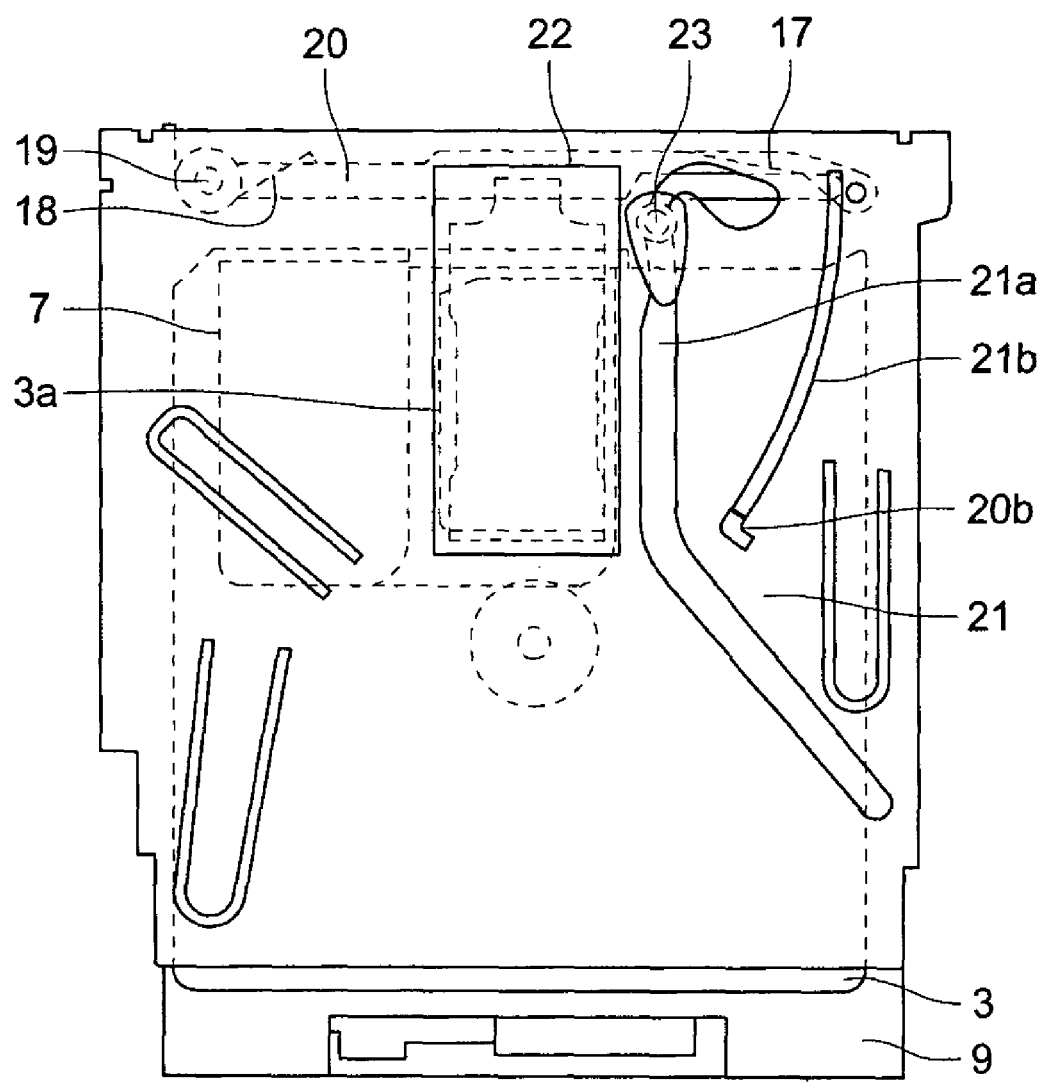
FIG. 7 is a diagram showing how a disk cartridge is inserted in FIG. 4.

A shape of the first guide groove 21a is established so that shutter 7 may become the state of fully open as shown in FIG. 7 under the condition that insertion of disk cartridge 3 has been completed, when disk cartridge 3 is inserted in a space between the upper face of base 9 and cartridge box 21, and when shutter opener 23 moves along the first guide groove 21a to push connectedly-provided portion 7a provided connectedly on shutter 7 of disk cartridge 3 to move the shutter 7 in the direction to open.

Further, on the base 9, there is formed opening 9g that correspond to hole 3a of the inserted disk cartridge 3, and on the opening 9h, there is provided optical pickup actuator 12 that conducts writing/reading of data for the recording surface of magneto-optical disk 10 of disk cartridge 3.

The lower face side of the base 9 will be explained as follows, referring to FIGS. 8–12.

On the lower face side of the base 9, there is provided a disk cartridge ejection mechanism that is composed as follows.

Figure 8:
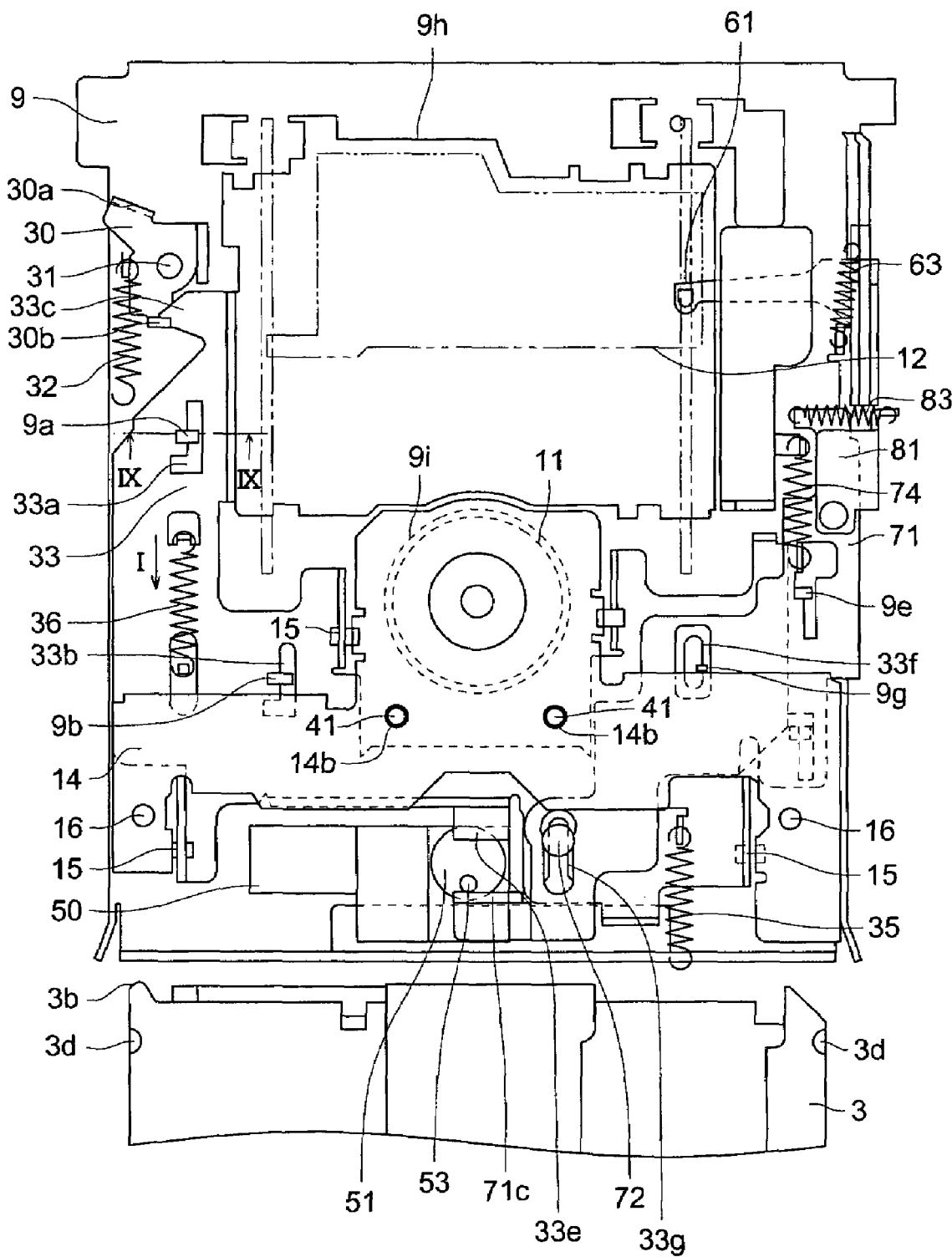
FIG. 8 is a diagram shown in the direction of an arrow mark C in FIG. 1 after an outer casing section, a front bezel, an electric control section and a flexible print circuit are removed from a magneto-optical disk driving apparatus in FIG. 1 in which a disk cartridge is not inserted.

As shown in FIG. 8, on the side on one hand of the lower face of the base 9, there is provided lock lever 30 so that it may rotate on pin 31. On the first rotary end portion of the lock lever 30, there is formed cartridge contact surface 30a that can touch corner portion 3b of disk cartridge 3 that is bent toward the upper face of the base 9 and is inserted.

The lock lever 30 is urged by spring 32 whose one end portion is engaged with the lock lever 30 and the other end portion is engaged with the base 9, in the direction for cartridge-contact-surface 30a to touch corner portion 3b of the inserted disk cartridge 3.

Figure 9:
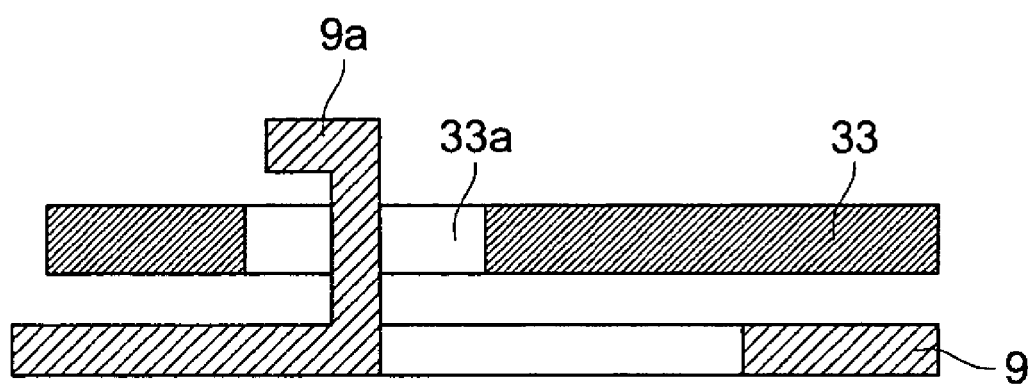
FIG. 9 is a sectional view taken on line IX—IX in FIG. 8.

Slide plate 33 is arranged on the base 9. On the slide plate 33, there are formed four elongated holes 33a, 33b, 33f and 33g in the direction of insertion of disk cartridge 3, and these elongated holes 33a, 33b and 33f are engaged respectively with bent pieces 9a, 9b and 9g formed on the base 9 as shown in FIG. 9 that is a sectional view taken on IX—IX in FIG. 8, further, elongated hole 33g is engaged with pin 72 provided on the base 9, and slide plate 33 is capable of moving only in the direction of insertion of disk cartridge 3. Further, the slide plate 33 is urged toward the cartridge insertion opening by urging force of spring 36 and by urging force of spring 35 whose one end portion is engaged with the base 9 respectively.

Under the state of non-insertion of a disk cartridge, hook portion 33c of slide plate 33 is in the state where it is engaged with lifted engagement portion 30b of lock lever 30, resisting the urging force of spring 36 and spring 35 as shown in FIG. 8.

On the slide plate 33, there is arranged motor plate 14 on which spindle motor 11 is affixed.

The spindle motor 11 is capable of protruding to the upper face of the base 9 through an unillustrated hole provided on the base 9.

Figure 10:
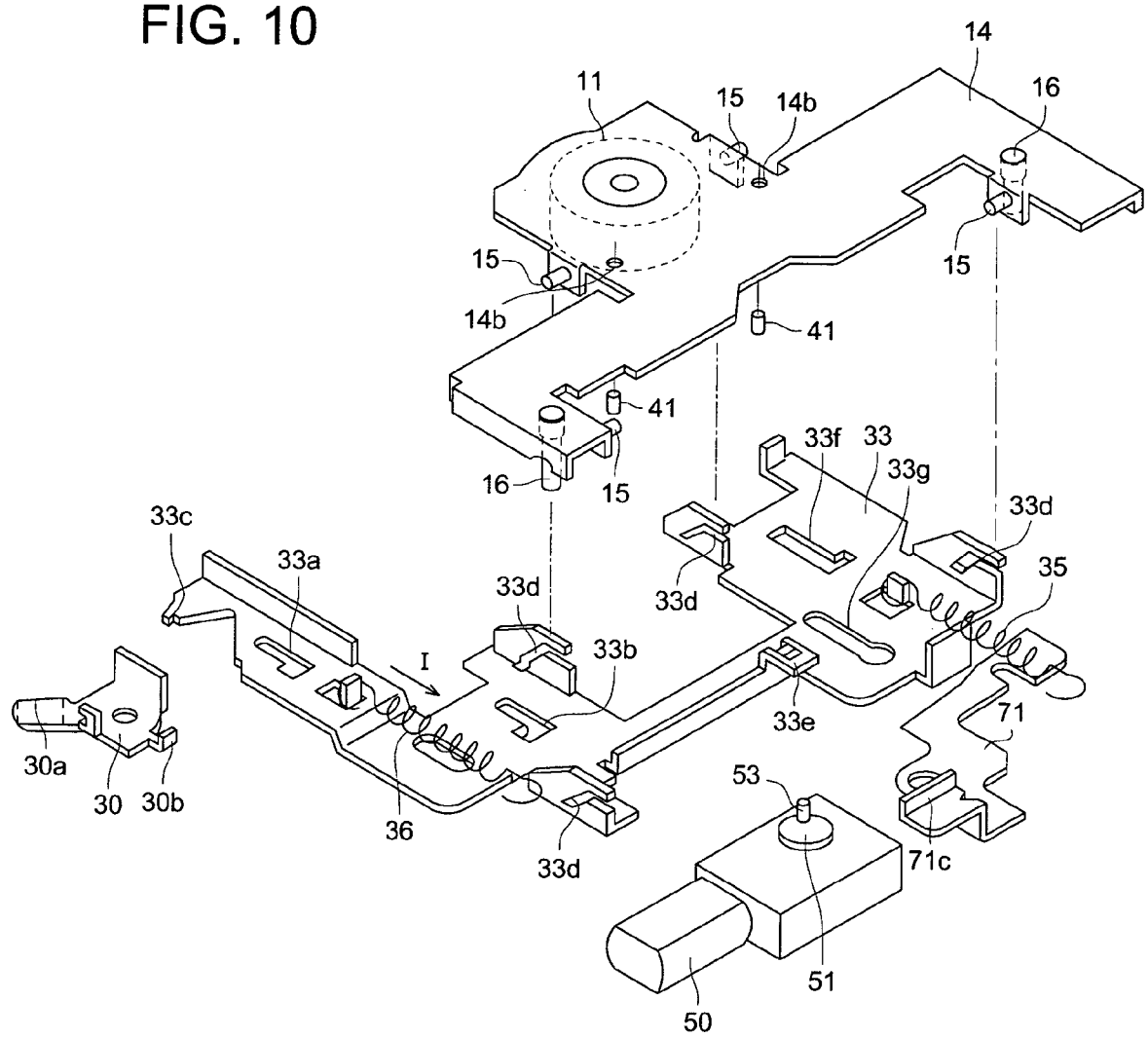
FIG. 10 is a perspective view of a lock lever, a slide plate and a motor plate ejection motor in FIG. 8.

As shown in FIG. 10, four pins 15 are provided on the side face of the motor plate 14, and these pins 15 are engaged respectively with cam grooves 33d which are formed on slide plate 33. Further, two holes 14b which engages respectively with guide bars 41 provided on the base 9 are formed on the motor plate 14 so that it may move only in the direction perpendicular to the base 9.

Figure 12:
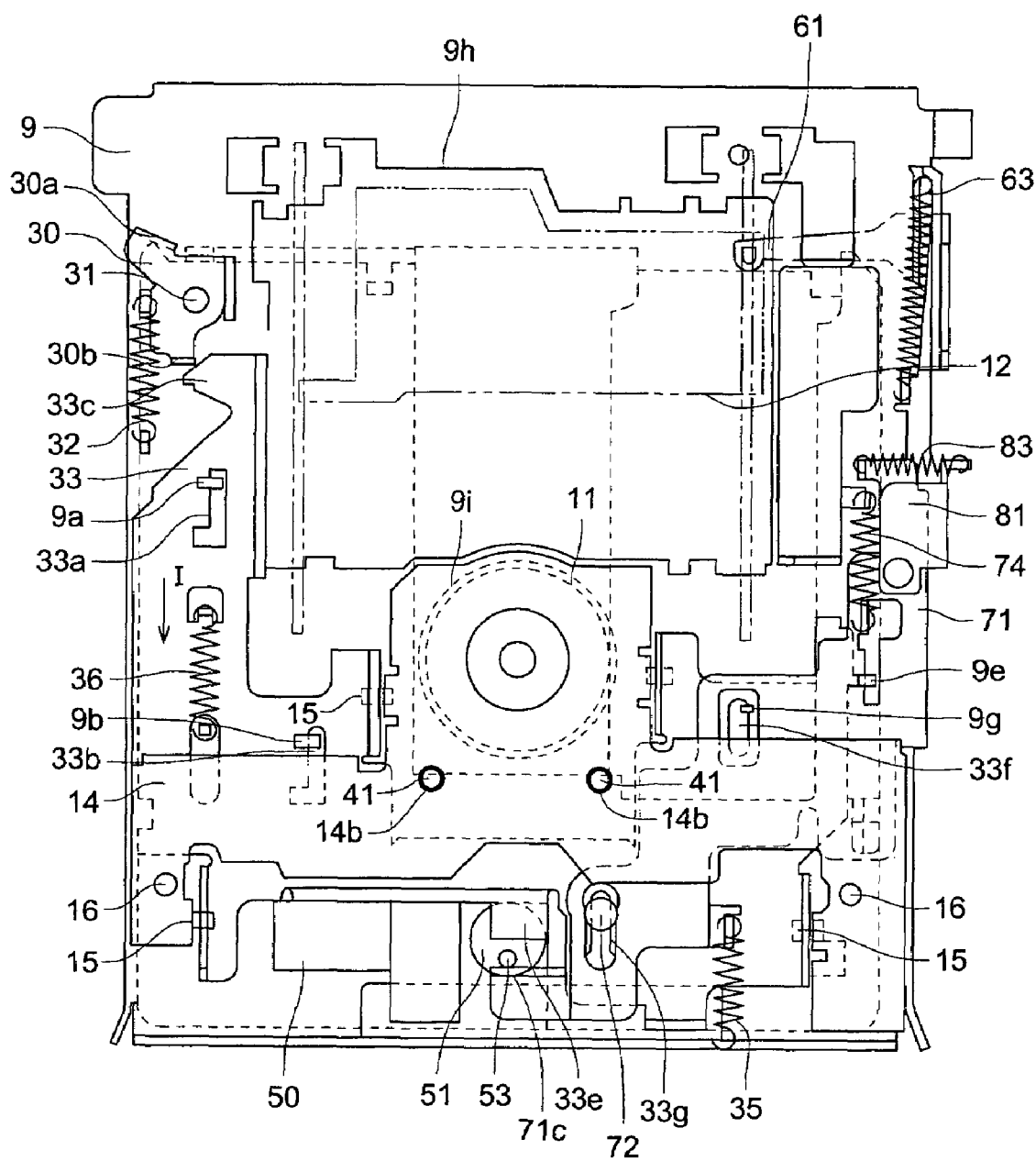
FIG. 12 is a diagram showing the state wherein a cartridge is at a loading position in FIG. 8.

Therefore, in FIG. 8 showing the state of non-insertion of a disk cartridge, if the engagement of the lifted engagement portion 30b of lock lever 30 and engagement portion 33c of slide plate 33 is released, the slide plate 33 is moved in the direction of arrow I by urging force of spring 36 and spring 35 to result in the state shown in FIG. 12. Then, the motor plate 14 is moved by cam grooves 33d in the direction to approach the base 9, and spindle motor 11 conducts movement to protrude from the upper face of the base 9 through hole 9i of the base 9.

Then, the motor plate 14 approaches the base 9 and stops when it hits three stopper pins (not shown) arranged on the base 9. In this case, spindle motor 11 protrudes from the upper face of the base 9, and engages with hub 10a of magneto-optical disk 10 in disk cartridge 3. Further, as shown in FIG. 10, a movement of the disk cartridge 3 is prohibited when positioning pins 16 provided on the motor plate 14 are engaged with positioning holes 3c (see FIG. 3) on disk cartridge 3. Namely, the positioning pins 16 function as a lock means that prohibits a movement of disk cartridge 3 at the loading position.

When the motor plate 14 parts from the base 9 in the aforementioned state, the spindle motor 11 descends from the upper face of the base 9 to be disengaged from hub 10a of magneto-optical disk 10 in disk cartridge 3, and further, the positioning pins 16 provided on the motor plate 14 are disengaged from positioning holes 3c on disk cartridge 3, thus, the disk cartridge 3 is allowed to move.

As shown in FIGS. 8 and 10, ejection motor 50 is provided to be adjacent to slide plate 33. On an output shaft of the ejection motor 50, there is mounted disc 51, and eccentric pin 53 provided at the position that is eccentric for the output shaft of the ejection motor 50 is provided on the disc 51. On the other hand, bent contact portion 33e with which the eccentric pin 53 can come in contact is formed on the slide plate 33. Under the condition where engagement between hook portion 33c of the slide plate 33 and lifted engagement portion 30b of lock lever 30 is released, when ejection motor 50 is driven, the eccentric pin 53 presses the bent contact portion 33e of the slide plate 33, resisting the urging force of spring 36 and spring 35, to move the slide plate 33 in the direction opposite to the direction of arrow I, thus, the engagement portion 33c of the slide plate 33 engages with the lifted engagement portion 30b of lock lever 30.

Figure 11:
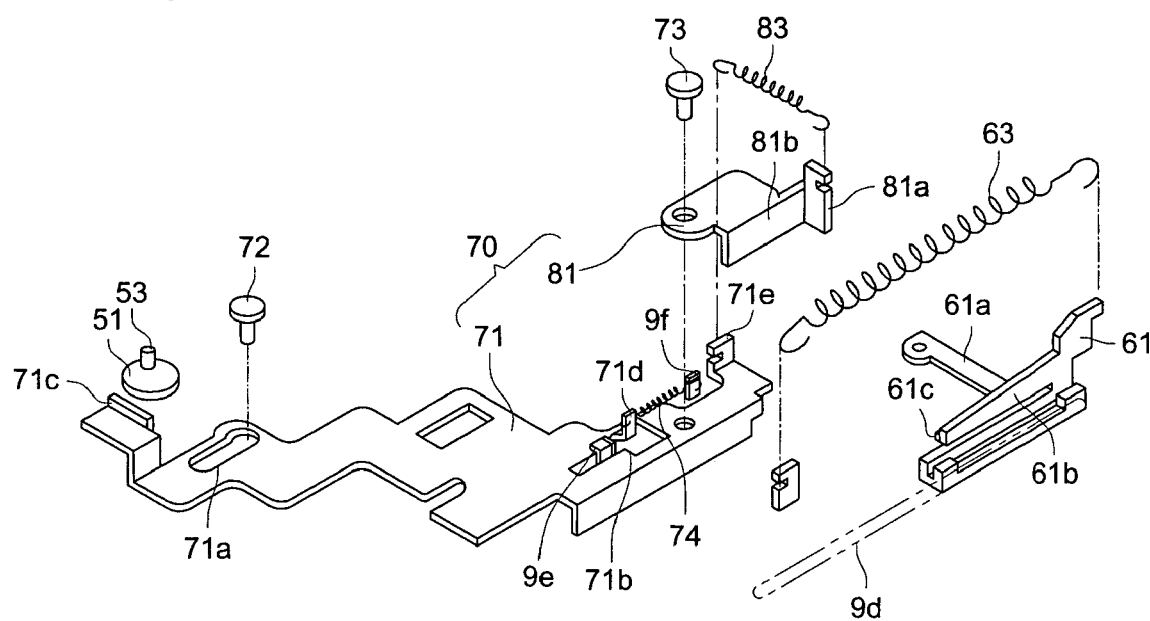
FIG. 11 is a perspective view of a cartridge engagement means.

As shown in FIG. 8, cartridge stopper 61 serving as a cartridge hooking means is arranged on a side face on the other side of the base 9. This cartridge stopper 61 engages with guide hole 9d formed on the side face of the base 9 as shown in FIG. 11, to be capable of moving in the direction of insertion of disk cartridge 3. The cartridge stopper 61 has thereon arm portion 61a that can come in contact with the front surface of disk cartridge 3 to be inserted. Further, on the cartridge stopper 61, there is formed elastic arm portion 61b that can be bent in the direction of the side of disk cartridge 3, and on the tip of the elastic arm 61b, there is formed convex portion 61c that can engage with engagement groove 3d (see FIGS. 3(a) and 3(b)) serving as a concave portion of disk cartridge 3.

On the other hand, on the base 9, there is provided cartridge engagement assistance means 70 that is composed of plate 71 and lock arm 81. On the plate 71, there are formed first guide hole 71a and second guide hole 71b both extending in the direction of insertion of a cartridge. Then, pin 72 to be attached on the base 9 is inserted in the first guide hole 71a, and bent piece 9e of the base 9 is engaged with the second guide hole 71b, thus, the plate 71 can move only in the direction of insertion of disk cartridge 3. On the plate 71, there is formed contact portion 71c with which the eccentric pin 53 driven by ejection motor 50 comes in contact. Thus, the plate 71 is urged in the direction for the contact portion 71c to come in contact with eccentric pin 53, when an end portion on the other side of the spring 74 whose end portion on one side is engaged with lifted engagement portion 9f of the base 9 is engaged with engagement portion 71d of the plate 71.

On the plate 71, there is provided lock arm 81 that can rotate on pin 73. On the side face on one side of the lock arm 81, there is formed bent portion 81b that is bent in the direction of base 9. This bent portion 81b is capable of touching the surface that is opposite to the surface on which convex portion 61c of elastic arm portion 61b of cartridge stopper 61 is provided. Further, the lock arm 81 is urged in the direction for the bent portion 81b to come in contact with elastic arm portion 61b of cartridge stopper 61, when an end portion on the other side of the spring 83 whose end portion on one side is engaged with lifted portion 71e of plate 71 is engaged with lifted engagement portion 81a of lock arm 81.

(3) Operations (Inserting Disk Cartridge)

Operations for inserting disk cartridge 3 will be explained first, referring to FIGS. 1, 4 and 8 each showing the state where disk cartridge 3 is not inserted.

When disk cartridge 3 is inserted in a space between the upper face of base 9 and cartridge box 21, shutter opener 23 is pressed by the disk cartridge 3 and moves along the first guide groove 21a and opens shutter 7 of the disk cartridge 3. Further, the movement of the shutter opener 23 makes arm 20 to move along the second guide groove 21b.

Further, when disk cartridge 3 is inserted, a front face of the disk cartridge 3 touches arm portion 61a of cartridge stopper 61, and concurrently with the foregoing, convex portion 61c of elastic arm portion 61b of cartridge stopper 61 engages with engagement groove 3d of disk cartridge 3. In the present embodiment, engagement force (second holding force) of the elastic arm portion 61b was made to be 500 gf or less. If the disk cartridge 3 is further inserted, the cartridge stopper 61 also moves together with the disk cartridge 3, resisting urging force of spring 63.

Incidentally, "the engagement force" mentioned in the present specification implies a force to engage with engagement groove 3d of disk cartridge 3 when pulling disk cartridge 3 and thereby separating convex portion 61c of elastic arm portion 61b from engagement groove 3d of disk cartridge 3.

Then, when corner portion 3b of the disk cartridge 3 pushes cartridge contact surface 30a of lock lever 30, the lock lever 30 rotates on pin 31, and engagement between the lifted engagement portion 30b of the lock lever 30 and engagement portion 33c of slide plate 33 is released. Then, the slide plate 33 is moved in the direction of arrow I by urging force of spring 36 and spring 35 in FIG. 8 to result in the state shown in FIG. 12.

In this case, motor plate 14 is moved by cam grooves 33d of slide plate 33 in the direction to approach the base 9, and spindle motor 11 provided on the motor plate 14 conducts movement to protrude from the upper face of the base 9 through hole 9i of the base 9.

Then, the motor plate 14 approaches the base 9, and when it hits three stopper pins (not shown) provided on the base 9, spindle motor 11 protrudes from the upper face of the base 9, and engages with hub 10a of magneto-optical disk 10 in disk cartridge 3. Further, as shown in FIG. 10, a movement of the disk cartridge 3 is prohibited when positioning pins 16 provided on the motor plate 14 are engaged with positioning holes 3c (see FIG. 3(b)) on disk cartridge 3. Namely, the positioning pins 16 function as a lock means that prohibits a movement of disk cartridge 3 at the loading position.

Thus, the state wherein writing and reading of data are possible, namely, the state shown in FIG. 12 that is the state of loading is resulted by optical pickup actuator 12.

(Ejecting Disk Cartridge)

When ejection switch 2b is pressed, ejection motor 50 rotates, and eccentric pin 53 first pushes bent contact portion 33e of slide plate 33 by resisting urging force of spring 36 and spring 35 to move the slide plate 33 in the direction opposite to the direction of arrow I, and engagement portion 33c of slide plate 33 is engaged again with lifted engagement portion 30b of lock lever 30.

Due to this movement of the slide plate 33, motor plate 14 is moved in the direction to leave the base 9, and engagement between spindle motor 11 provided on the motor plate 14 and hub 10a of magneto-optical disk 10 in disk cartridge 3 is released. Further, engagement between positioning pin 16 provided on the motor plate 14 and positioning hole 3c of disk cartridge 3 is released, which makes it possible for the disk cartridge 3 to move.

After the disk cartridge 3 is made to be possible to move, it is moved in the direction to be ejected by elastic repulsive power of springs including spring 17 to urge shutter opener 23, spring 18 to urge arm 20 and spring 63 to urge cartridge stopper 61. In this case, the cartridge stopper 61 is also moved together with disk cartridge 3.

Figure 13:
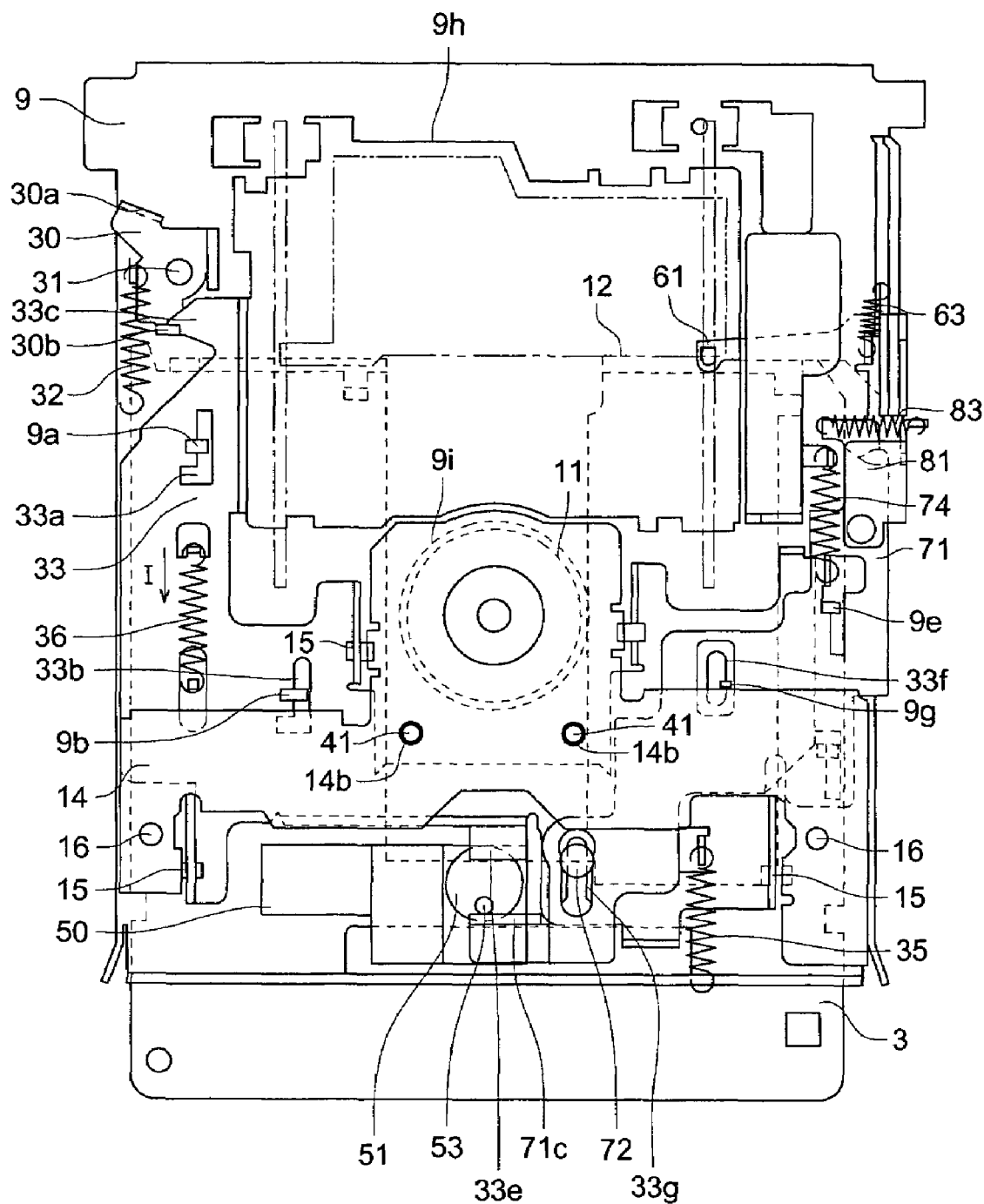
FIG. 13 is a diagram showing the state wherein a cartridge is at a position where the cartridge can be taken out in FIG. 8.

Then, when the cartridge stopper 61 comes in contact with a final end of guide hole 9d, a movement of the disk cartridge 3 is stopped as shown in FIG. 13. This position of the disk cartridge 3 is a position where the cartridge can be taken out. In this case, a rear portion of the disk cartridge 3 is in a position to be protruded from cartridge insertion opening 2a so that the disk cartridge 3 can be taken out manually from the outside of the apparatus.

Plate 71 provided on lock arm 81 is constantly urged in the direction opposite to that of arrow I by spring 74, and a position of the plate 71 in the direction of arrow I is determined when contact portion 71c is constantly in contact with eccentric pin 53 of ejection motor 50. Therefore, the plate 71 moves in the direction of arrow I or the direction opposite to that of arrow I, interlocking constantly with a rotation of eccentric pin 53 of ejection motor 50.

At this point in time, lock arm 81 urged by spring 83 of cartridge stopper assistance means 70 is in the state wherein the lock arm can touch the surface that is opposite to the surface on which convex portion 61c of elastic arm portion 61b of cartridge stopper 61 is provided. Incidentally, in the present embodiment, engagement force (first holding force) for the combination of the lock arm 81 urged by spring 83 and elastic arm portion 61b of cartridge stopper 61 is made to be 800 gf or more.

Then, the ejection motor 50 rotates further, and the eccentric pin 53 pushes contact portion 71c of plate 71 in the direction of arrow I this time. Due to this, the plate 71 moves, resisting urging force of spring 74, which releases the state to be capable of being in contact with the surface that is opposite to the surface on which convex portion 61c of elastic arm portion 61b of cartridge stopper 61 on lock arm 81 is provided.

The structure described above makes it possible to obtain the following effects (1) through (4).

(1) Since there are provided cartridge engagement assistance means 70 that prevents releasing of engagement of cartridge stopper 61 representing a cartridge engagement means with disk cartridge 3 at the point in time when the disk cartridge 3 moves from the loading position shown in FIG. 12 to the position shown in FIG. 13 where the disk cartridge can be taken out, and eccentric pin 53 representing a releasing means that releases engagement of cartridge engagement assistance means 70 with cartridge stopper 61 after disk cartridge 3 has moved from the loading position to the position where the disk cartridge can be taken out, the cartridge stopper 61 hooks on disk cartridge 3 at the point in time when the disk cartridge 3 has moved from the loading position to the position where the disk cartridge can be taken out, and the cartridge engagement assistance means 70 prevents releasing of engagement of the cartridge stopper 61 with disk cartridge 3. Namely, the first holding force (800 gf or more) stated above is used for holding. Therefore, the disk cartridge 3 surely stops at the position where the disk cartridge can be taken out.

Owing to the releasing of engagement of cartridge engagement assistance means 70 with cartridge stopper 61 conducted by eccentric pin 53 after disk cartridge 3 has moved from loading position to the position where disk cartridge can be taken out, namely, owing to holding with the second holding force (500 gf or less), engagement of the disk cartridge at the position where the cartridge can be taken out is only by cartridge stopper 61, and it becomes easy to take out disk cartridge 3.

(2) The ejection speed for disk cartridge 3 is increased, and even when elastic arm portion 61b of cartridge stopper 61 having convex portion 61c that engages with engagement groove 3d of disk cartridge 3 tries to part from engagement groove 3d of disk cartridge 3, the surface that is opposite to the surface on which convex portion 61c of elastic arm portion 61b of cartridge engagement assistance means 70 is provided comes in contact with touchable lock arm 81 to prohibit that convex portion 61c of elastic arm portion 61b of cartridge stopper 61 parts from hook groove 3d of disk cartridge 3.

Therefore, the disk cartridge 3 surely stops at the position where the disk cartridge can be taken out.

(3) When a great power is applied on elastic arm portion 61b of cartridge stopper 61 for some reasons to make the elastic arm portion 61b to part from engagement groove 3d of disk cartridge 3, cartridge engagement assistance means 70 has plate 71 on which lock arm 81 is provided rotatably and has spring 83 representing lock arm urging means that urges lock arm 81 in the direction of elastic arm portion 61b of cartridge stopper 61, and when the elastic arm portion 61b tries to part from disk cartridge 3 with the force greater than the urging force of the spring 83, the lock arm 81 is also pushed by the elastic arm portion 61b to rotate to prevent damage of elastic arm portion 61b and lock arm 81.

(4) By driving ejection motor 50, slide plate 33 representing a lock releasing means is driven first, then, disk cartridge 3 is moved from the loading position to the position where a disk cartridge can be taken out, and after the disk cartridge 3 has arrived at the position where a disk cartridge can be taken out, plate 71 of cartridge engagement assistance means 70 is moved to the position where there is no contact between lock arm 81 of cartridge engagement assistance means 70 and elastic arm portion 61b of cartridge stopper 61, thus, the disk cartridge 3 surely stops at the position where the disk cartridge can be taken out.

The invention is not limited to the embodiment stated above. Though the cartridge stopper 61 that engages with hook groove 3d of disk cartridge 3 is made to be capable of moving in the embodiment mentioned above, the cartridge stopper may also be fixed on base 9.

As stated above, in the invention of Structure (1) or Structure (6), there are provided a cartridge engagement means that engages with the disk cartridge and prohibits that the disk cartridge further moves from the position where the disk cartridge can be taken out in the direction to take out at the point in time when at least the disk cartridge has moved from the loading position to the position where the disk cartridge can be taken out, a cartridge engagement assistance means that prevents releasing of engagement of the cartridge engagement means with the disk cartridge at the point in time when the disk cartridge has moved from the loading position to the position where the disk cartridge can be taken out, and an assistance releasing means that releases the state wherein the cartridge engagement assistance means prevents releasing of engagement of the cartridge engagement means with the disk cartridge after the disk cartridge has moved from the loading position to the position where the disk cartridge can be taken out. Therefore, at the point in time when the disk cartridge has moved from the loading position to the position where the disk cartridge can be taken out, the cartridge engagement means engages with the disk cartridge and prohibits that the disk cartridge moves further from the position where the disk cartridge can be taken out in the direction to take out. Accordingly, the disk cartridge surely stops at the position where a disk cartridge can be taken out.

Further, owing to the releasing of the state wherein the cartridge engagement assistance means prevents releasing of engagement of the cartridge engagement means with the disk cartridge conducted by the assistance releasing means after the disk cartridge has moved from the loading position to the position where the disk cartridge can be taken out, the disk cartridge is engaged with only the disk cartridge engagement means at the position where a cartridge can be taken out, which makes it easy to take out the disk cartridge.

In Structure (2), when an ejecting speed of the disk cartridge is increased and the elastic arm of the cartridge engagement means having the convex portion engaging with the concave portion of the disk cartridge tries to part from the concave portion of the disk cartridge accordingly, the surface on the opposite side of the face on which the convex portion of the elastic arm of the cartridge engagement means of the cartridge engagement assistance means comes in contact with the lock arm capable of being touched, and the convex portion of the elastic arm of the cartridge engagement means is prohibited to part from the concave portion of the disk cartridge. Therefore, the disk cartridge stops surely at the position where the disk cartridge can be taken out.

In Structure (3), when a large force is applied on the elastic arm of the cartridge engagement means for some reasons to make the elastic arm to part from the concave portion of the disk cartridge, the cartridge engagement assistance means having the plate on which the lock arm is provided rotatably and the lock arm urging means that urges the lock arm toward the elastic arm prevents damage of the elastic arm and the lock arm with the lock arm being pushed by the elastic arm to rotate, when the elastic arm tries to part with force greater than the urging force of the urging means.

In Structure (4), the plate of the cartridge engagement assistance means is provided to be movable in the cartridge ejecting direction, and has a plate guiding means that guides the plate between the position where the elastic arm can touch the lock arm and the position where the elastic arm does not touch the lock arm, and the locking releasing means has an ejection motor and an eccentric pin which is driven by the ejection motor to rotate and releases the locking means and the cartridge engagement assistance means, and when the ejection motor is driven, the eccentric pin releases the locking means first, and thereby, urging force of the urging means moves the disk cartridge from the position of loading to the position where the disk cartridge can be taken out, and it moves the plate of the cartridge engagement assistance means to the position where the elastic arm does not touch the lock arm after the disk cartridge arrives at the position where the disk cartridge can be taken out, thus, the disk cartridge stops surely at the position where the disk cartridge can be taken out.

According to Structure (5), in the disk cartridge ejection method for moving a disk cartridge from a loading position where reading and reproducing of information are possible for a medium in the disk cartridge to a disk-cartridge-removable position where the disk cartridge can be taken out of an information recording and reproducing apparatus, the disk cartridge is held by the first holding force which does not allow the disk cartridge to move further, at least at a point in time when the disk cartridge has moved to a position where the disk cartridge can be taken out from the loading position, and afterwards, the disk cartridge is held by the second holding force that is smaller than the first holding force, and thereby, the cartridge engagement means engages with a disk cartridge and the cartridge engagement assistance means prevents releasing of engagement of the cartridge engagement means for the disk cartridge, at a point in time when the disk cartridge moves from the loading position to the position where the disk cartridge can be taken out. Therefore, the disk cartridge stops surely at the position where the disk cartridge can be taken out.

Further, owing to the releasing of engagement of the cartridge engagement assistance means with the cartridge engagement means conducted by the releasing means after the disk cartilage has moved from the loading position to the position where the disk cartilage can be taken out, the disk cartridge is engaged with only the disk cartridge engagement means at the position where a cartridge can be taken out, which makes it easy to take out the disk cartridge.

What is claimed is:

1. A disk cartridge ejection mechanism for moving a disk cartridge from a loaded position in which information is recorded in and reproduced from a recording medium inside the disk cartridge, to a removal position in which the disk cartridge can be taken out from an information recording and reproducing apparatus, the disk cartridge ejection mechanism comprising:
    a cartridge engagement device for engaging with the disk cartridge to inhibit the disk cartridge from moving beyond the removal position, while the disk cartridge is moved from the loaded position to the removal position;
    a cartridge engagement assistance device movable between a release position at which a release of an engagement of the cartridge engagement device with the disk cartridge is allowed, and a prevention position at which the release of the engagement of the cartridge engagement device with the disk cartridge is prevented, wherein while the disk cartridge is moved from the loaded position to the removal position the cartridge engagement assistance device is situated in the prevention position; and
    a releasing device for moving the cartridge engagement assistance device from the prevention position to the release position, after the disk cartridge is moved from the loaded position to the removal position.

2. The disk cartridge ejection mechanism of claim 1, further comprising:
    an urging member for urging the disk cartridge toward an ejection direction; and
    a locking member for inhibiting the disk cartridge from moving at the loaded position thereof; and
    a lock releasing device for releasing the locking member.

3. The disk cartridge ejection mechanism of claim 1, wherein the cartridge engagement device comprises an elastic arm having a protrusion to engage with a concave portion of the disk cartridge, and the cartridge engagement assistance device comprises a lock arm for coming in contact with a surface on an opposite side of a surface where the protrusion of the elastic arm is provided.

4. The disk cartridge ejection mechanism of claim 3, wherein the cartridge engagement assistance device comprising:
    a plate on which the lock arm is rotatably provided; and
    a lock arm urging member for urging the lock arm toward the elastic arm.

5. The disk cartridge ejection mechanism of claim 4, wherein the plate of the cartridge engagement assistance device is provided movably in the ejection direction of the disk cartridge, and comprises a plate guide for guiding the plate between a position in which the elastic arm is in contact with the lock arm and a position in which the elastic arm is not in contact with the lock arm,
    wherein the lock releasing device comprises an ejection motor, and an eccentric pin driven and rotated by the ejection motor for releasing the locking member and the cartridge engagement assistance device, and
    wherein when the ejection motor is driven, the eccentric pin releases the locking member, the urging member moves the disk cartridge from the loaded position toward the removal position by urging force, and moves the plate of the cartridge engagement assistance device to the position in which the elastic arm is not in contact with the lock arm, after the disk cartridge reaches the removal position.

6. The disk cartridge ejection mechanism of claim 1, wherein the cartridge engagement assistance device comprises an urging member for urging the cartridge engagement assistance device toward the prevention position so that a moving load toward the release position of the cartridge engagement device is increased.

7. The disk cartridge ejection mechanism of claim 1, wherein the cartridge engagement assistance device applies an additional urging force to the cartridge engagement device to prevent the release of the engagement of the cartridge engagement device with the disk cartridge while the disk cartridge is moved from the loaded position to the removal position, and
    wherein the cartridge engagement assistance device removes the additional urging force to the cartridge engagement device after the disk cartridge is moved from the loaded position to the removal position.

8. The disk cartridge ejection mechanism of claim 7, wherein the cartridge engagement assistance device comes into contact with the cartridge engagement device to apply the additional urging force to the cartridge engagement device.

9. A disk cartridge ejection method for moving a disk cartridge from a loaded position in which information is recorded in and reproduced from a recording medium inside the disk cartridge, to a removal position in which the disk cartridge can be taken out from an information recording and reproducing apparatus, the disk cartridge ejection method comprising:
    holding the disk cartridge with a first holding force by which the disk cartridge is not moved further than the removal position by applying an additional holding force to the disk cartridge at least while the disk cartridge is moved from the loaded position to the removal position; and
    thereafter holding the disk cartridge with a second holding force that is smaller than the first holding force by removing the additional holding force, after the disk cartridge in moved from the loaded position to the removal position.

10. An information recording and reproducing apparatus, comprising:
    a disk cartridge ejection mechanism for moving a disk cartridge from a loaded position in which information is recorded in and reproduced from a recording medium inside the disk cartridge, to a removal position in which the disk cartridge can be taken out from the information recording and reproducing apparatus, the disk cartridge ejection mechanism comprising:

a cartridge engagement device for engaging with the disk cartridge to inhibit the disk cartridge from moving beyond the removal position, while the disk cartridge is moved from the loaded position to the removal position;

a cartridge engagement assistance device movable between a release position at which a release of an engagement of the cartridge engagement device with the disk cartridge is allowed, and a prevention position at which the release of the engagement of the cartridge engagement device with the disk cartridge is prevented, wherein while the disk cartridge is moved from the loaded position to the removal position, the cartridge engagement assistance device is situated in the prevention position; and a releasing device for moving the cartridge engagement assistance device from the prevention position to the release position, after the disk cartridge is moved from the loaded position to the removal position.

* * * * *